United States Patent
Ito et al.

(10) Patent No.: US 7,736,581 B2
(45) Date of Patent: Jun. 15, 2010

(54) MANUFACTURING METHOD OF PLUGGED HONEYCOMB STRUCTURE

(75) Inventors: Koichi Ito, Nagoya (JP); Takeshi Tokunaga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 333 days.

(21) Appl. No.: 11/954,693

(22) Filed: Dec. 12, 2007

(65) Prior Publication Data

US 2008/0174055 A1 Jul. 24, 2008

(30) Foreign Application Priority Data

Jan. 18, 2007 (JP) ............................. 2007-009545

(51) Int. Cl.
*B28B 11/02* (2006.01)
(52) U.S. Cl. ...................... 264/630; 264/631
(58) Field of Classification Search .............. 264/630, 264/631
See application file for complete search history.

(56) References Cited

U.S. PATENT DOCUMENTS

| 2005/0076991 | A1 | 4/2005 | Fujita | |
|---|---|---|---|---|
| 2008/0164643 | A1* | 7/2008 | Ito et al. ..................... | 264/621 |
| 2009/0229765 | A1* | 9/2009 | Furukubo .................. | 156/584 |
| 2009/0283928 | A1* | 11/2009 | Ito et al. ..................... | 264/69 |

FOREIGN PATENT DOCUMENTS

| JP | A-06-190218 | 7/1994 |
|---|---|---|
| JP | A-06-190224 | 7/1994 |
| JP | A-2001-300922 | 10/2001 |
| JP | A-2003-320517 | 11/2003 |
| JP | A-2005-262097 | 9/2005 |

OTHER PUBLICATIONS

Pending U.S. Patent Application, filed Dec. 11, 2007 in the name of Koichi Ito et al.

* cited by examiner

*Primary Examiner*—Steven P Griffin
*Assistant Examiner*—Russell J Kemmerle, III
(74) *Attorney, Agent, or Firm*—Oliff & Berridge, PLC

(57) ABSTRACT

A method is provided for manufacturing a plugged honeycomb structure 30 including a honeycomb substrate 1 and plugging portions 15 arranged so as to form complementary checkered patterns at both end surfaces 11 and 21 of the honeycomb substrate 1. The method includes attaching a first mask film 4a to the first end surface 11 of the honeycomb substrate 1, making slurry permeation holes 3a to introduce a plugging slurry 6, attaching a second mask film 4b to the second end surface 21 of the honeycomb substrate 1, making slurry permeation holes 3b, allowing air to flow into the cells 2 so as to discharge air giving a pressure of 0.05 to 5 MPa between the first mask film 4a and the honeycomb substrate 1; and filling cell opening end portions 7 with the plugging slurry 6 to fire the resultant slurry filled substrate 20.

3 Claims, 3 Drawing Sheets

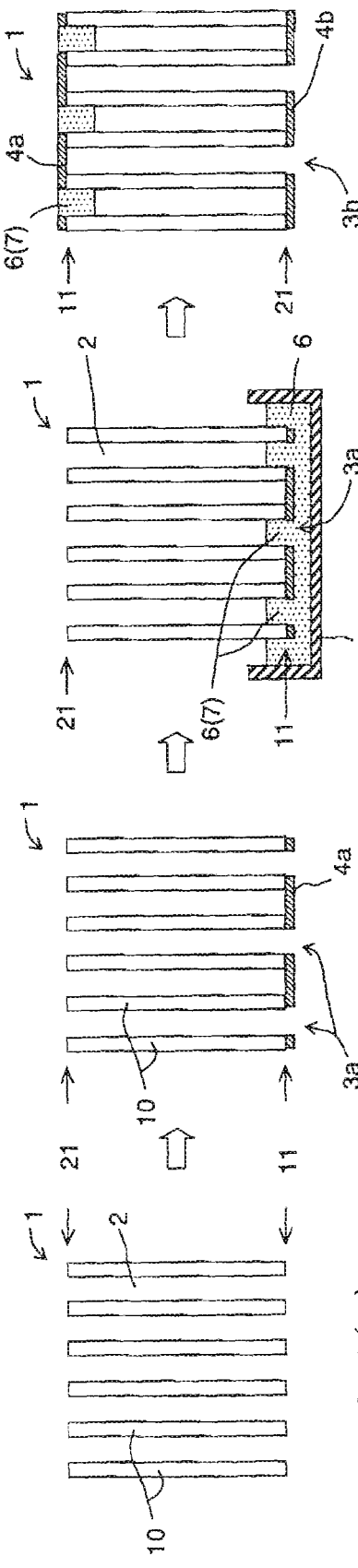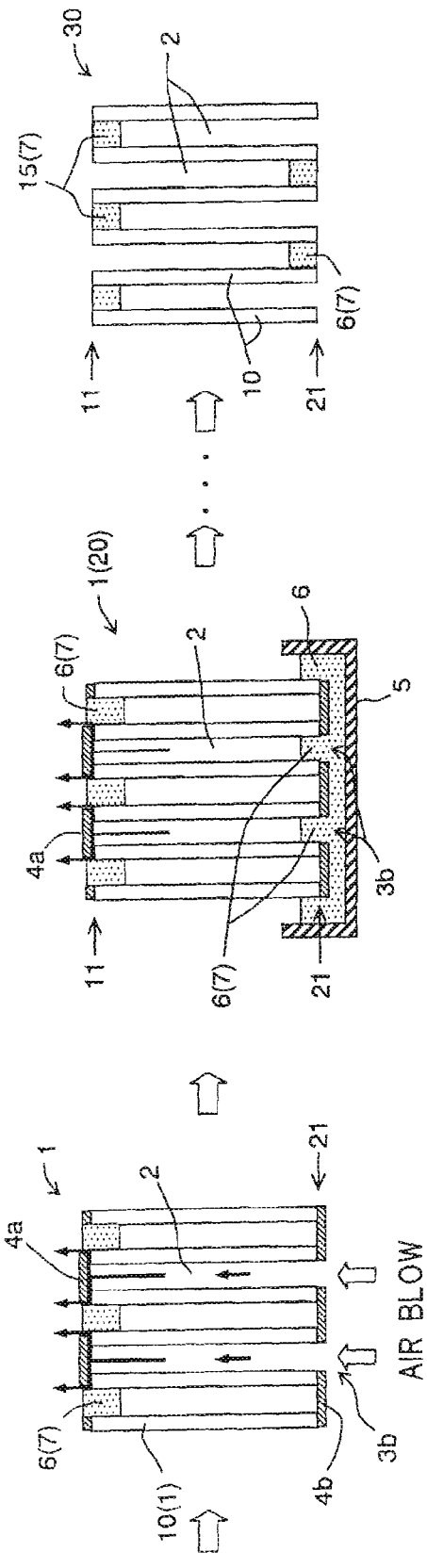

AIR BLOW

MANUFACTURING METHOD OF PLUGGED HONEYCOMB STRUCTURE

BACKGROUND OF THE INVENTION

1. Field of the Invention

The present invention relates to a manufacturing method of a plugged honeycomb structure which can preferably be used in a filter such as a diesel particulate filter and in which predetermined cells at an end surface of the structure are plugged.

2. Description of the Related Art

As a dust collecting filter typified by a diesel particulate filter (DPF), a filter having a honeycomb structure and made of a ceramic is used. Such a filter has a honeycomb structure having a large number of cells which are separated and formed by porous partition walls so as to constitute channels of a fluid, and each cell is plugged on one end portion opposite to that of an adjacent cell so that each end surface of the honeycomb structure has a checkered pattern.

When an exhaust gas including fine particles such as particulates is passed from one end surface of the filter (a plugged honeycomb structure), the exhaust gas flows into the structure from the cells having the end portions which are not plugged on the one end surface, passes through the porous partition walls and enters the other cells having end portions which are not plugged on the other end surface of the structure. Then, when the exhaust gas flows through the partition walls, the fine particles in the exhaust gas are trapped by the partition walls, and the cleaned exhaust gas from which the fine particles have been removed is discharged from the other end surface of the honeycomb structure.

Usually, to manufacture the plugged honeycomb structure having such a configuration, a method is employed in which as shown in FIG. 2, a mask film 4 to constitute a mask is attached to an end surface of a honeycomb substrate 1, holes 3 are provided at positions corresponding to opening end portions (cell opening end portions 7) of predetermined cells 2a and 2b of the mask film 49 and an end portion of the honeycomb substrate 1 is submerged into a container 5 in which a plugging slurry 6 is stored, whereby the plugging slurry 6 is allowed to permeate the predetermined cell opening end portions 7 through the holes 3 of the mask film 4 (e.g., see Patent Document 1).

In a case where the opening end portions of the predetermined cells are plugged by such a method, the plugging slurry 6 does not sometimes permeate into a desired depth of the cells 2a and 2b. Moreover, the permeation depth of the plugging slurry in the cells 2a and 2b is not sometimes uniform, and there has been a problem that it is difficult to manufacture a homogeneous plugged honeycomb structure. In a case where the permeation depth of the plugging slurry which permeates the respective cells to be plugged is not uniform, fluctuations are generated in a pressure loss of each cell of the resultant plugged honeycomb structure, and a disadvantage that deviation is generated in a deposited amount of filtered matters or the like easily occurs.

As a concerned conventional technology for solving the above problems, a method is disclosed in which the plugging slurry having thixotropy is used, and the plugging slurry is allowed to permeate the predetermined cells of the honeycomb substrate while vibrated (e.g., see Patent Documents 2 and 3).

However, even in the methods disclosed in Patent Documents 2 and 3, there is a case where the plugging slurry 6 does not always permeate into the desired depth of the cells 2a and 2b, and the permeation depth is not uniform. Since a device for vibrating the plugging slurry is required, an equipment tends to enlarge and become complicated.

[Patent Document 1] JP-A 2001-300922
[Patent Document 2] JP-A 6-190218
[Patent Document 3] JP-A 6-190224

SUMMARY OF THE INVENTION

The present invention has been developed in view of such problems of the conventional technology, and an object thereof is to provide a manufacturing method of a plugged honeycomb structure in which a plugging slurry can uniformly be allowed to permeate into a desired depth of cells, and a product defect such as plugging failure is hardly generated easily.

That is, according to the present invention, there is provided the following manufacturing method of a plugged honeycomb structure.

[1] A manufacturing method of a plugged honeycomb structure including a cylindrical honeycomb substrate in which a plurality of cells having two opening end portions are separated by partition walls and formed so as to communicate with both end surfaces of the honeycomb substrate, and plugging portions arranged so as to plug one of the two opening end portions of the cells and form a complementary checkered pattern with one end surface and the other end surface of the honeycomb substrate, the method comprising: a first attaching and perforation step of attaching a first mask film to one of the end surfaces of the honeycomb substrate, and making slurry permeation holes at portions of the first mask film corresponding to the one opening end portion of each of the predetermined cells; a first filling step of submerging, into a plugging slurry, the one end surface of the honeycomb substrate to which the first mask film has been attached, and filling the one opening end portion of each of the predetermined cells with the plugging slurry; a second attaching and perforation step of attaching a second mask film to the other end surface of the honeycomb substrate, and making slurry permeation holes at portions of the second mask film corresponding to the one opening end portion of each of the predetermined cells; an air blowing step of allowing air to flow from the other end surface of the honeycomb substrate into the cells so that the air is discharged with a pressure of 0.05 to 5 MPa between the first mask film at the one end surface of the honeycomb substrate and the honeycomb substrate; a second filling step of submerging, into the plugging slurry, the other end surface of the honeycomb substrate to which the second mask film has been attached, and filling the one opening end portion of each of the predetermined cells with the plugging slurry to obtain a slurry filled substrate; and a firing step of firing the resultant slurry filled substrate.

[2] The manufacturing method of the plugged honeycomb structure according to the above [1], wherein the air is allowed to flow from the other end surface of the honeycomb substrate into the cells so that the air is discharged with a pressure of 0.1 to 4 MPa between the first mask film at the one end surface of the honeycomb substrate and the honeycomb substrate.

[3] The manufacturing method of the plugged honeycomb structure according to the above [1] or [2], wherein an adhesive force of at least the first mask film is in a range of 1 to 15 N/cm.

According to the manufacturing method of the plugged honeycomb structure of the present invention, it is possible to easily manufacture the plugged honeycomb structure in which the plugging slurry can be allowed to uniformly permeate into a desired depth of the cells and a product defect such as plugging failure is hardly generated easily.

BRIEF DESCRIPTION OF THE DRAWINGS

FIG. 1 is a schematic diagram showing one embodiment of a manufacturing method of a plugged honeycomb structure according to the present invention;

DESCRIPTION OF THE PREFERRED EMBODIMENT

Figure 2:
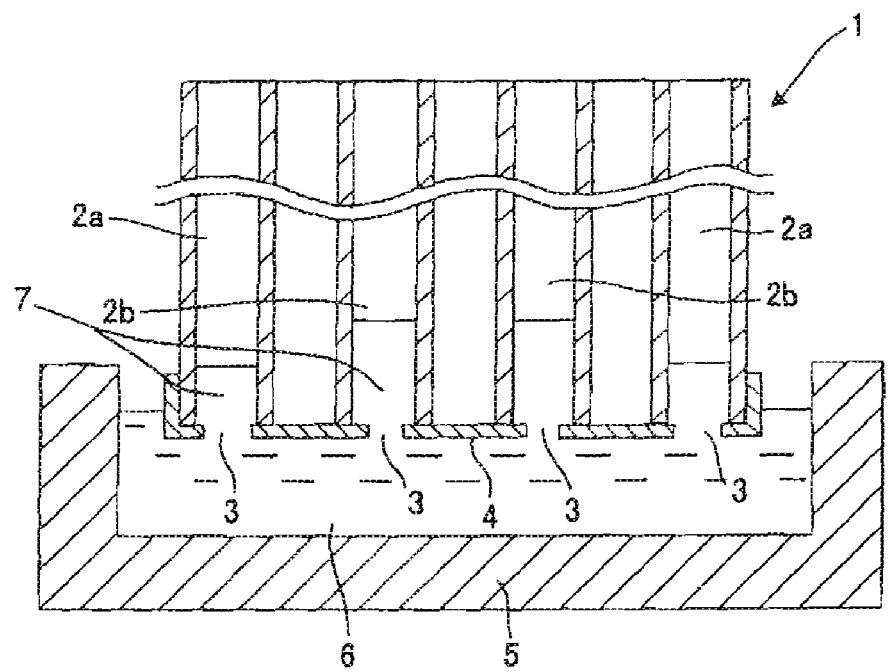
FIG. 2 is a schematic diagram showing a conventional state in which a plugging slurry is allowed to permeate cell opening end portions.

The best mode for carrying out the present invention will hereinafter be described, but it should be understood that the present invention is not limited to the following embodiment and that appropriate modification, improvement and the like added to the following embodiment based on ordinary knowledge of a person skilled in the art without departing from the scope of the present invention fall in the scope of the present invention.

FIG. 1 is a schematic diagram showing a part of one embodiment of a manufacturing method of a plugged honeycomb structure according to the present invention. The manufacturing method of the plugged honeycomb structure according to the present embodiment is a method of manufacturing a plugged honeycomb structure 30 in which opening end portions (cell opening end portions 7) of predetermined cells 2 of a cylindrical honeycomb substrate 1 provided with a plurality of cells 2 separated by partition walls 10 between end surfaces (a first end surface 11, a second end surface 21) are filled with a plugging slurry 6, and then fired to form plugging portions 15 at the predetermined cell opening end portions 7. Further details of the manufacturing method of the plugged honeycomb structure according to the present invention will hereinafter be described.

In the manufacturing method of the plugged honeycomb structure according to the present embodiment, first the cylindrical honeycomb substrate 1 provided with the plurality of cells 2 separated by the partition walls 10 so as to communicate the first end surface 11 and the second end surface 21 is prepared (FIG. 1(a)).

To prepare the honeycomb substrate, first there is used, as a material, powder of one type of material selected from the group consisting of a ceramic such as cordierite, mullite, alumina, spinel, zirconia, silicon carbide, a silicon carbide-cordierite based composite material, a silicon-silicon carbide based composite material, silicon nitride, lithium aluminum silicate, aluminum titanate or zeolite; a metal such as an Fe—Cr—Al based metal; and a combination of these materials. To this material, a binder such as methyl cellulose or hydroxyl propoxyl methyl cellulose is added, and further a surfactant and water are added to obtain a mixed material. Subsequently, the resultant mixed material is formed into a clay having plasticity, extruded and formed into a honeycomb shape, and then dried or fired, so that the honeycomb substrate 1 can be prepared.

A first attaching and perforation step first attaches a first mask film 4a to the first end surface 11 of the honeycomb substrate 1 (FIG. 1(b)). There is not any special restriction on a type of the first mask film 4a, but it is preferable that film can be melted by heat and also be perforated by irradiation with laser light. It is preferable to use, as the first mask film 4a, a film having an adhesive layer so as to be fixed on the end surface of the honeycomb substrate 1. Specific examples of such a film include a film including a base layer constituted of a polymer material such as polyester, polyolefin or halogenated polyolefin, and the adhesive layer laminated on this base layer and constituted of an acrylic adhesive material or the like. From viewpoints of strength and easiness of making holes, it is preferable that a thickness of the first mask film 4a is about 10 to 100 µm.

Subsequently to the attaching of the first mask film 4a, the first attaching and perforation step makes slurry permeation holes 3a at portions of the first mask film 4a corresponding to one opening end portion (cell opening end portion 7) of each of the predetermined cells 2 (FIG. 1(b)). The slurry permeation holes 3a function as inflow ports for allowing a plugging slurry to flow into the cell opening end portions 7 in the subsequent step. It is to be noted that it is preferable to set a diameter of the slurry permeation holes 3a to 30 to 70% of an opening area of the slurry permeation holes 3a, because the plugging slurry having a viscosity described later easily permeates the holes in a satisfactory state. It is further preferable to set the diameter to 40 to 60%, and it is especially preferable to set the diameter to around 50%.

There is not any special restriction on a method of making the slurry permeation holes 3a in the first mask film 4a, but, for example, a method of making the slurry permeation holes 3a by laser irradiation is preferable. Moreover, the slurry permeation holes 3a may be made one by one in the first mask film 4a with one needle, or a large number of the slurry permeation holes 3a may collectively be made using bundle needles planted on the plate having a pitch of the predetermined cell opening end portions 7. In addition, it is preferable that an image of the first end surface 11 of the honeycomb substrate 1 is processed to extract positions of the cells 2 in which the slurry permeation holes 3a are to be made, and the slurry permeation holes 3a are made at the extracted positions by use of a laser marker, so that even the honeycomb substrate 1 in which the pitch and an opening shape of the cells 2 are not constant can flexibly be handled.

A first filling step submerges the first end surface 11 of the honeycomb substrate 1 to which the first mask film 4a has been attached into the plugging slurry 6 to fill the cell opening end portions 7 with the plugging slurry 6 (FIG. 1(c)). At this time, since any mask film is not attached to the second end surface 21, the plugging slurry 6 can permeate into a desired depth of the cells 2. It is to be noted that the plugging slurry can be prepared by mixing at least ceramic powder and a dispersion medium for the slurry. Preferable examples of the dispersion medium for the slurry include an organic solvent such as acetone, ethanol or methanol, and water.

To the plugging slurry, if necessary, an additive such as a binder or deflocculant may further be added. There is not any special restriction on a type of the ceramic powder, but, for example, silicon carbide powder, cordierite powder or the like may preferably be used. As the binder, a resin such as polyvinyl alcohol (PVA) may be used, but it is more preferable to use a thermal gel setting binder having a property of gelating by heating. As the thermal gel setting binder, methyl cellulose may preferably be used. It is to be noted that the plugging slurry has a viscosity of usually 100 to 2000000 mPa·s, preferably 500 to 1500000 mPa·s, further preferably about 1000 to 1000000 mPa·s.

A second attaching and perforation step first attaches a second mask film 4b to the second end surface 21 of the honeycombs substrate 1 (FIG. 1(d)). As the second mask film 4b, a mask similar to the above first mask film 4a may preferably be used.

Subsequently to the attaching of the second mask film 4b, the second attaching and perforation step makes slurry permeation holes 3b at portions of the attached second mask film 4b corresponding to one opening end portion (cell opening end portions 7) of each of the predetermined cells 2 (FIG. 1(d)). In the same manner as in the slurry permeation holes 3a made at the first mask film 4a, the slurry permeation holes 3b function as inflow ports for allowing the plugging slurry to flow into the cell opening end portions 7 in the subsequent step. It is to be noted that a preferable diameter of the slurry permeation holes 3b is similar to that of the above slurry permeation holes 3a. Preferable examples of a method of making the slurry permeation holes 3b at the second mask film 4b include a method similar to the method of making the slurry permeation holes 3a at the first mask film 4a.

Figure 3:
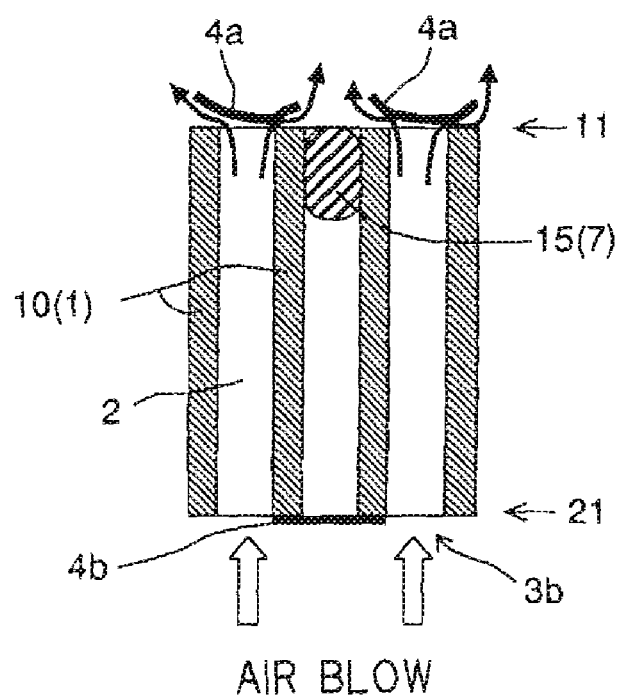
FIG. 3 is a sectional view schematically showing one example of an air blowing step in a manufacturing method of a plugged honeycomb structure according to the present invention.

An air blowing step allows air to flow from the second end surface 21 of the honeycomb substrate 1 into the cells 2 (FIG. 1(e)). The air is allowed to flow in this manner, whereby as shown in FIG. 3, the first mask film 4a attached to the first end surface 11 of the honeycomb substrate 1 slightly peels, and a gap from which the air in the cells can flow is formed between the first end surface 11 of the honeycomb substrate 1 and the first mask film 4a. In a case where the plugging slurry is allowed to flow into the cells 2 through the slurry permeation holes 3b, the gap functions as an outflow port for discharging, from the cells 2, the air which has been introduced into the cells 2 and which cannot flow outwards.

To allow the air to flow from the second end surface 21 of the honeycomb substrate 1 into the cells 2, the air is allowed to flow into the cells 2 so that the air is discharged with a pressure of 0.05 to 5 MPa, preferably 0.1 to 4 MPa, further preferably 0.15 to 3.5 MPa between the first mask film 4a at the first end surface 11 and the honeycomb substrate 1. The pressure of the air to be discharged (the air discharge pressure) is set to the above numeric value range, the first mask film 4a can slightly be peeled, and a disadvantage such as breakage or peeling is not generated in the second mask film 4b to which the air is blown. When the air discharge pressure is less than 0.05 MPa, an excessively small amount of the air flows into the cells, and hence the first mask film 4a insufficiently peels. On the other hand, if the air discharge pressure exceeds 5 MPa, a disadvantage such as the breakage and the peeling is sometimes generated in the second mask film 4b.

A system of the air blowing may be performed intermittently (in a pulsed manner) or continuously. However, from a viewpoint of prevention of leak of the plugging slurry due to the peeling of the mask film, the air is preferably blown intermittently (in the pulsed manner).

Figure 4:
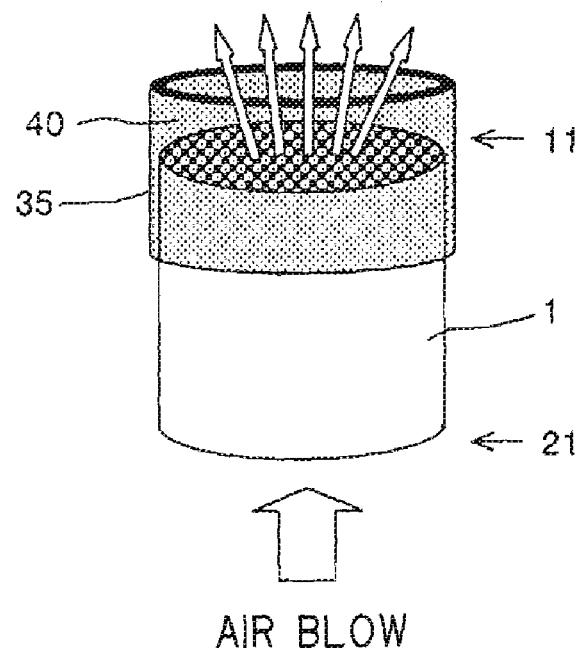
FIG. 4 is a schematic diagram snowing a method of measuring an air discharge pressure.

FIG. 4 is a schematic diagram showing a method of measuring the air discharge pressure. To measure the air discharge pressure in the air blowing step, as shown in FIG. 4, a cover 35 is disposed so as to come in close contact with an outer peripheral surface of the honeycomb substrate 1, whereby the first end surface 11 of the honeycomb substrate 1 is covered to form a discharge space 40. Subsequently, the air is blown from the side of a second end surface 21 of the honeycomb substrate 1 so that the air is discharged from the side of the first end surface 11. A pressure of the air in the discharge space 40 is measured as the "air discharge pressure". It is to be noted that the pressure of the air in the discharge space 40 can be measured using a usual vacuum gauge.

A second filling step submerges the second end surface 21 of the honeycomb substrate 1 to which the second mask film 4b has been attached into the plugging slurry 6 to fill the cell opening end portions 7 with the plugging slurry 6, thereby obtaining a slurry filled substrate 20 (FIG. 1(f)). When the plugging slurry 6 permeates the cells 2 through the slurry permeation holes 3b, the air in the cells 2 is quickly pushed out of the cells through the gap formed between the first end surface 11 of the honeycomb substrate 1 and the first mask film 4a. Therefore, the plugging slurry 6 can evenly permeate into a desired depth of the cells 2, and the plugged honeycomb structure in which the plugging portions have high reliability can easily be manufactured. It is to be noted that as the plugging slurry 6, a slurry similar to the slurry used in the above first filling step may preferably be used.

After the slurry filled substrate 20 is obtained, if necessary, the slurry filled substrate is dried, and heated and/or fired, so that the plugged honeycomb structure 30 provided with the plugging portions 15 can be manufactured (FIG. 1(g)). It is to be noted that in general, the plugged honeycomb structure 30 can be manufactured by performing the first and second filling steps of filling the predetermined cell opening end portions 7 with the plugging slurry 6, and then performing the firing, but the first and second filling steps may be performed with respect to an unfired honeycomb structure formed body (a dried body), or a fired honeycomb structure body.

Figure 5:
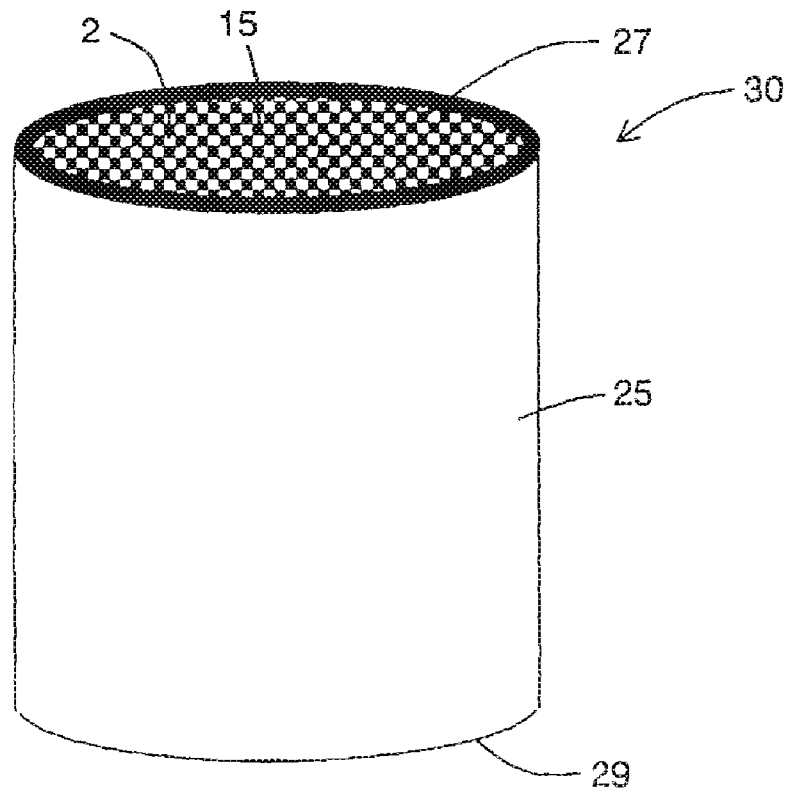
FIG. 5 is a perspective view showing one example of the plugged honeycomb structure.

For example, as shown in FIG. 5, in the plugged honeycomb structure 30 manufactured according to the manufacturing method of the plugged honeycomb structure of the present invention, as long as the plurality of cells 2 are separated by the porous partition walls and extend from one end surface 27 to the other end surface 29 in an axial direction and the cells 2 have the plugging portions 15 arranged at either of the end surfaces 27 and 29 so as to plug the end surfaces, there is not any restriction on a shape of the structure. It is to be noted that reference numeral 25 in FIG. 5 is an outer peripheral wall which surrounds an outer periphery of the partition walls.

A sectional shape of the plugged honeycomb structure crossing an extending direction of the cells at right angles can appropriately be adopted from a circular shape, an elliptic shape, a race-track shape, a quadrangular shape and the like based on an application and an installation place. A sectional shape of the cell crossing the extending direction of the cells at right angles may be selected from a polygonal shape such as a triangular shape, a quadrangular shape or a hexagonal shape, a substantially polygonal shape, a circular shape and a substantially circular shape such as an elliptic shape. A cell density is usually set to 6 to 2000 cells/square inch (0.9 to 311 cells/cm$^2$), preferably about 50 to 1000 cells/square inch (7.8 to 155 cells/cm$^2$). When the plugged honeycomb structure 30 (see FIG. 5) is used as a catalyst carrier or a filter, it is preferable that the partition walls and the outer peripheral wall 25 are porous.

EXAMPLES

The present invention will hereinafter specifically be described in accordance with examples, but the present invention is not limited to these examples.

(Preparation of Honeycomb Substrate)

A mixed material made of cordierite, an organic binder, a pore former and water was formed into a honeycomb shape, and then dried to prepare a cylindrical honeycomb substrate having an outer diameter of 5.66 inches (144 mm) and a length of six inches (152 mm). In the prepared honeycomb substrate, cells had a square sectional shape crossing an extending direction of the cells at right angles, partition walls had a thickness of about 0.3 mm, and a cell density was 300 cells/square inch.

(Preparation of Plugging Slurry)

To 100 parts by mass of cordierite powder, 1.5 parts by mass of methyl cellulose, eight parts by mass of glycerin and 40 parts by mass of water were added and kneaded to prepare a plugging slurry. It is to be noted that the prepared plugging slurry had a viscosity of 200 mPa·s.

Example 1

A mask film (a tape in which a polyester base material is coated with an acrylic adhesive, an adhesive force: 5.3 N/cm, thickness: mm, trade name "Masking Tape", manufactured by 3M Co.) was attached to one end surface (a first end surface) of a honeycomb substrate, and then slurry permeation holes were made at portions of the attached mask film corresponding to predetermined cell opening end portions (so as to obtain a checkered pattern) by use of laser. Subsequently, the end surface of the honeycomb substrate provided with the mask film was submerged into a depth of 5 mm in a plugging slurry to fill the cell opening end portions with the plugging slurry through the slurry permeation holes. Afterward, the above-mentioned mask film was attached to the other end surface (a second end surface) of the honeycomb substrate, and then slurry permeation holes were made at portions of the attached mask film corresponding to predetermined cell opening end portions (so as to obtain a checkered pattern) by use of the laser.

Subsequently, air was allowed to flow from the second end surface of the honeycomb substrate into cells so that the air was discharged with a pressure of 0.05 MPa between the mask film at the first end surface and the honeycomb substrate. As for an air blowing system, a pulse system was used, a pulse system was used. Afterward, the second end surface of the honeycomb substrate was submerged into a depth of 5 mm in the plugging slurry to fill the cell opening end portions with the plugging slurry through the slurry permeation holes.

After pulling up the honeycomb substrate from the plugging slurry, the material was dried at 100° C. for 120 seconds. Afterward, in the same manner as in the above first end surface, the second end surface of the honeycomb substrate was submerged into the plugging slurry to fill the cell opening end portions at the other end surface of the honeycomb substrate with the plugging slurry. The honeycomb substrate was dried at 100° C. for 120 seconds, and fired for 50 hours to manufacture a plugged honeycomb structure.

When an average plugging depth (mm) of the plugging portions of the manufactured plugged honeycomb structure was measured, the depth was 4.88 mm at the first end surface, the depth was 4.92 mm at the second end surface, and an average achievement ratio of the plugging depth with respect to a target depth (5 mm) at the second end surface was 98.4%. When the presence of plugging failure was inspected there was not any portion of the plugging failure.

Examples 2 to 6 and Comparative Examples 1 to 6

Plugged honeycomb structures were manufactured in the same manner as in Example 1 except that as air blowing methods and air discharge pressures, methods and numeric values shown in Table 1 were used. Plugging portions of the manufactured plugged honeycomb structures were measured and evaluated in the same manner as in Example 1. Results are shown in Table 1.

TABLE 1

| | Air blowing method | Air discharge pressure (Mpa) | Average plugging depth (mm) | | Average target plugging depth achievement ratio at second end surface (%) | Evaluation of plugging failure | Remarks |
|---|---|---|---|---|---|---|---|
| | | | First end surface | Second end surface | | | |
| Example 1 | Pulse | 0.05 | 4.88 | 4.92 | 98.4 | None | |
| Example 2 | Continuous | 0.05 | 4.96 | 5.05 | 101.0 | None | |
| Example 3 | Pulse | 5 | 4.79 | 4.86 | 97.2 | None | |
| Comparative Example 1 | — | — | 4.99 | 2.14 | 42.8 | present, but few | |
| Comparative Example 2 | Pulse | 0.04 | 4.73 | 3.45 | 69.0 | present, but few | *1 |
| Comparative Example 3 | Pulse | 6 | 5.10 | 2.06 | 41.2 | present | *2 |

*1: An air passing incomplete portion was generated.
*2: (1) A mismatch between cell positions and perforated position was generated owing to the breakage and hollow of the mask film. (2) Excessive plugging was generated owing to the break of the mask film. (3) Breakage was generated in the honeycomb substrate.

As shown in Table 1, in the methods of Examples 1 to 3, as compared with the methods of Comparative Examples 1 to 3, it is clear that the plugging slurry permeates into a desired depth and the plugging portions having a sufficient depth are Formed. According to the methods of Examples 1 to 3, it is clear that the plugged honeycomb structure having an excellent quality can be manufactured without causing any plugging failure.

A manufacturing method of a plugged honeycomb structure according to the present invention is preferable as a method of manufacturing a plugged honeycomb structure for use in a filter such as a DPF.

What is claimed is:

1. A manufacturing method of a plugged honeycomb structure including a cylindrical honeycomb substrate in which a plurality of cells having two opening end portions are separated by partition walls and formed so as to communicate with both end surfaces of the honeycomb substrate, and plugging portions arranged so as to plug one of the two opening end portions of the cells and form a complementary checkered pattern with one end surface and the other end surface of the honeycomb substrate, the method comprising:

a first attaching and perforation step of attaching a first mask film to one of the end surfaces of the honeycomb substrate, and making slurry permeation holes at portions of the first mask film corresponding to the one opening end portion of each of the predetermined cells;

a first filling step of submerging, into a plugging slurry, the one end surface of the honeycomb substrate to which the first mask film has been attached, and filling the one opening end portion of each of the predetermined cells with the plugging slurry;

a second attaching and perforation step of attaching a second mask film to the other end surface of the honeycomb substrate, and making slurry permeation holes at portions of the second mask film corresponding to the one opening end portion of each of the predetermined cells;

an air blowing step of allowing air to flow from the other end surface of the honeycomb substrate into the cells so that the air is discharged with a pressure of 0.05 to 5 MPa between the first mask film at the one end surface of the honeycomb substrate and the honeycomb substrate;

a second filling step of submerging, into the plugging slurry, the other end surface of the honeycomb substrate to which the second mask film has been attached, and filling the one opening end portion of each of the predetermined cells with the plugging slurry to obtain a slurry filled substrate; and a firing step of firing the resultant slurry filled substrate.

2. The manufacturing method of the plugged honeycomb structure according to claim 1, wherein the air is allowed to flow from the other end surface of the honeycomb substrate into the cells so that the air is discharged with a pressure of 0.1 to 4 MPa between the first mask film at the one end surface of the honeycomb substrate and the honeycomb substrate.

3. The manufacturing method of the plugged honeycomb structure according to claim 1, wherein an adhesive force of at least the first mask film is in a range of 1 to 15 N/cm.

* * * * *